United States Patent
Fuchs et al.

(10) Patent No.: US 9,706,715 B2
(45) Date of Patent: Jul. 18, 2017

(54) FEEDERHOUSE FOR A COMBINE HARVESTER HAVING AN AXIALLY MOVABLE FLOATING BEARING

(71) Applicant: Deere & Company, Moline, IL (US)

(72) Inventors: Volker Fuchs, Saarburg (DE); Philipp Veit, Molauer Land (DE); Martin Rittershofer, Kaiserslautern (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/703,487

(22) Filed: May 4, 2015

(65) Prior Publication Data

US 2016/0007538 A1 Jan. 14, 2016

(30) Foreign Application Priority Data

Jul. 10, 2014 (DE) ............. 10 2014 213 445

(51) Int. Cl.
*B65G 19/24* (2006.01)
*A01F 12/46* (2006.01)
*A01D 41/12* (2006.01)
*A01D 61/00* (2006.01)

(52) U.S. Cl.
CPC ........... *A01F 12/46* (2013.01); *A01D 41/12* (2013.01); *A01D 61/008* (2013.01)

(58) Field of Classification Search
CPC ...... B65G 15/52; B65G 17/42; B65G 17/063; A01D 61/00; A01D 2017/106; A01F 12/10; F16H 25/2204; F16H 25/2233; F16H 25/2285; F16H 2057/0221

USPC ....................................... 198/731
See application file for complete search history.

(56) References Cited

U.S. PATENT DOCUMENTS

| | | | | |
|---|---|---|---|---|
| 404,460 A * | 6/1889 | Akerson | .............. | B65G 19/10 198/728 |
| 1,889,064 A * | 11/1932 | Dunham | .............. | F16C 35/063 403/367 |
| 2,135,175 A * | 11/1938 | Fallon | .................. | C03B 35/165 193/37 |
| 2,501,163 A * | 3/1950 | Dowler | ................. | A01D 34/46 56/252 |
| 2,716,481 A * | 8/1955 | Dray | .................... | A01D 61/008 198/699 |
| 3,282,404 A * | 11/1966 | Corwith | ................. | A01F 29/10 198/620 |
| 3,971,390 A * | 7/1976 | McDuffie | ............... | A01F 12/16 209/658 |
| 4,023,671 A * | 5/1977 | Kramer | .................... | F16G 3/08 198/699 |
| 4,258,536 A * | 3/1981 | Kidd | ...................... | A01D 34/73 56/17.5 |
| 4,502,738 A * | 3/1985 | Nauta | ................ | B60B 33/0028 384/477 |

(Continued)

FOREIGN PATENT DOCUMENTS

| | | | |
|---|---|---|---|
| BE | 864412 A * | 6/1978 | ............. A01D 17/10 |
| DE | 3338792 A1 * | 5/1985 | ............. A01D 17/10 |
| EP | 212146 A1 * | 6/1986 | ............. A01D 17/10 |

*Primary Examiner* — Árpád Fábián-Kovács
(74) *Attorney, Agent, or Firm* — Rathe Lindenbaum LLP

(57) ABSTRACT

A feederhouse (20) for a combine harvester (10) has a drivable inclined conveyor shaft (80), which is supported via a bearing arrangement (48), which is designed as an axially movable floating bearing, on the housing (76) of the feederhouse (20).

11 Claims, 4 Drawing Sheets

(56) References Cited

U.S. PATENT DOCUMENTS

| | | | | |
|---|---|---|---|---|
| 4,553,663 A * | 11/1985 | Johnson | A01D 61/02 198/465.1 |
| 4,653,632 A * | 3/1987 | Timmer | A01D 17/10 198/822 |
| 4,657,029 A * | 4/1987 | Helm | A01F 12/16 460/106 |
| 4,724,909 A * | 2/1988 | Link | A01D 17/10 171/126 |
| 4,899,868 A * | 2/1990 | Johnson | A01D 61/02 198/520 |
| 4,908,002 A * | 3/1990 | Tanis | B65G 19/24 198/731 |
| 5,254,070 A * | 10/1993 | Callhoff | D02J 13/005 219/619 |
| 5,346,429 A * | 9/1994 | Farley | A01D 61/04 460/16 |
| 5,448,944 A * | 9/1995 | Line | A01F 15/07 100/88 |
| 5,480,352 A * | 1/1996 | Luscombe | A01D 17/10 198/731 |
| 5,547,448 A * | 8/1996 | Robertson | F16C 13/00 492/16 |
| 5,660,484 A * | 8/1997 | Peel | B62D 1/16 384/517 |
| 5,671,839 A * | 9/1997 | Sanderson | A01D 17/10 198/846 |
| 5,692,598 A * | 12/1997 | Rohrs | A01D 17/10 198/848 |
| 5,738,223 A * | 4/1998 | Rohrs | A01D 17/10 198/848 |
| 5,976,013 A * | 11/1999 | Hamann | A01D 61/008 460/114 |
| 6,106,391 A * | 8/2000 | Tjabringa | A01D 17/10 198/848 |
| 6,250,815 B1 * | 6/2001 | Picone | F16C 19/525 384/557 |
| 6,575,839 B1 * | 6/2003 | Brandon | A01D 34/6806 464/178 |
| 6,922,983 B2 * | 8/2005 | Gryspeerdt | A01D 61/008 198/550.12 |
| 7,473,168 B2 * | 1/2009 | Day | A01D 61/04 460/16 |
| 7,481,756 B2 * | 1/2009 | Derscheid | A01F 15/18 29/891 |
| 7,766,736 B2 * | 8/2010 | Ramp | A01F 12/10 460/16 |
| 2002/0164101 A1 * | 11/2002 | Bass | A01F 15/18 384/537 |
| 2002/0164256 A1 * | 11/2002 | Hansen | F01C 21/102 417/365 |
| 2004/0211650 A1 * | 10/2004 | Linder | B65G 19/24 198/841 |
| 2004/0250523 A1 * | 12/2004 | Schulz | A01F 12/10 56/153 |
| 2005/0020421 A1 * | 1/2005 | Cooksey | A01D 61/00 492/20 |
| 2005/0109000 A1 * | 5/2005 | Mulder | A01D 17/10 56/16.4 R |
| 2007/0193408 A1 * | 8/2007 | Martinez | A01D 69/06 74/609 |
| 2009/0223470 A1 * | 9/2009 | Rozario | F01L 1/047 123/90.17 |
| 2010/0288063 A1 * | 11/2010 | Wu | F16H 25/2418 74/89.4 |
| 2013/0313077 A1 * | 11/2013 | Boyd | A01D 61/008 198/617 |
| 2014/0367230 A1 * | 12/2014 | Jager | B65G 15/48 198/850 |
| 2015/0171702 A1 * | 6/2015 | Matsuda | F16D 23/14 310/68 B |

* cited by examiner

FEEDERHOUSE FOR A COMBINE HARVESTER HAVING AN AXIALLY MOVABLE FLOATING BEARING

FIELD OF THE INVENTION

The invention relates to conveyors for combine harvesters. More particularly it relates to feederhouses for combine harvesters.

BACKGROUND OF THE INVENTION

Combine harvesters are used to harvest crops from agriculturally cultivated plants, which are picked up by means of a harvesting attachment and are conveyed by feederhouses (also known as "inclined conveyor assemblies") into the actual combine harvester. There, the plants are threshed and the grain is cleaned. An inclined conveyor comprises a housing, in which an endless conveyor, with several pulling means arranged laterally next to one another, runs around a lower deflection roller and an upper inclined conveyor shaft, and conveys the material from below upward into the combine harvester. The endless conveyor comprises conveyor slats, which are fastened on two pulling means so as to convey the material.

Common inclined conveyors are equipped with chains that are used as pulling means, which work together with sprockets, which can be welded on the driven upper inclined conveyor shaft or fastened in some other way (especially in a detachable manner). As a result of the relatively large torques to be transferred, welded conveyors with hollow shafts have already been used as an upper inclined conveyor shaft; on the drive side (lying on the right in the movement direction), a shaft stub made of solid material is welded on (Part Number AZ49359 for Combine harvester Model Nos. 2054, 2056, 2058 of the Applicant), whereas on the other side, a flange of an end axle stub is screwed on the conveyor shaft, and the sprockets for driving the conveyor chains used as the pulling means are welded on the hollow shaft. The support of the conveyor shafts in the inclined conveyor housing is undertaken there on both ends by ball bearing arrangements, which are pushed onto the shaft and axle stubs from the outside. A support housing is set on the ball bearing arrangement; it, in turn, is screwed on the housing of the inclined conveyor. A sprocket or a belt pulley is fastened on the drive side of the conveyor shaft for the drive; it is connected with a drive train of the combine harvester by means of a chain or a belt.

The two part-construction of the conveyor shaft with the screwed-on axle stub is used so as to make possible the incorporation of the conveyor shaft into the inclined conveyor housing, in that the actual inclined conveyor shaft is first inserted into the housing such that the shaft stub projects through the housing to the outside. Then, the axle stub is inserted and screwed on the conveyor shaft, whereupon, from the outside of the housing, the ball bearing arrangements are shoved onto the axle and shaft stubs and fastened there so they cannot be moved axially, and finally, the support housing is screwed on the housing. This two-part construction of the conveyor shaft is relatively expensive.

The goal of the present invention is to make available improved inclined conveyors that do not have the aforementioned disadvantages or have them to a reduced extent.

SUMMARY OF THE INVENTION

The inclined conveyor for a combine harvester comprise a housing, a drivable inclined conveyor shaft, which is located in the housing and on which carrier elements are affixed for the transfer of the torque to endless pulling means, which, to some extent, go around the conveyor shaft, with conveyor slats fastened thereon, a deflector roller, which is located in the housing, around which the endless pulling means run, a first bearing arrangement, fastened on a first end of the conveyor shaft, which is connected, via a first holder, with the adjacent area of the housing, and a second bearing arrangement, fastened on a second end of the conveyor shaft, which is connected, via a second holder, with the adjacent area of the housing. The first bearing arrangement is designed as an axially movable, floating bearing.

In this way, the installation of the conveyor shaft is simplified, since the first bearing arrangement, designed as the floating bearing, can be pushed axially on the conveyor shaft so that, upon insertion of the conveyor shaft, it can be pushed into a position in which it and its holder do not hinder the incorporation of the conveyor shaft into the housing. The first bearing arrangement can then be brought into its final position later. Thus, it is possible (but need not necessarily be so) that a one-part inclined conveyor shaft is used, which is to be first assembled after insertion into the housing of the inclined conveyor and is more stable than a screw construction.

The second bearing arrangement can, in particular, be designed as a fixed bearing, although it could also be a floating bearing.

The holders preferably comprise two clamping elements that clamp the bearing arrangement between them.

The bearing arrangements can be located on the inside of the housing.

In a preferred embodiment, the holders also carry a pot-shaped sealing element, which protrudes inward from the housing and works together with a cylindrical sealing ring, which is affixed on a holder of the carrier elements. The sealing element and the sealing ring are used, in particular, as winding protection, and prevent crop stalks from becoming wrapped around the conveyor shaft.

Although it would be conceivable to design the carrier elements as chain sprockets to drive pulling means designed as a chain, it is, in particular, proposed that the carrier elements be cylindrical pins that work together with cams that are affixed, on the inside, on the pulling means, which are made of flexible material (see DE 10 2009 036 104 A1); the cams are welded on holders that, in turn, are welded on the conveyor shaft. The welding connections, which can also be used, moreover, without floating bearings in a conveyor shaft, make possible a transfer of a sufficiently large torque to the pulling means.

Preferably, the conveyor shaft consists of a middle hollow shaft and stubs of solid material inserted on the ends and welded thereon, wherein bearing arrangements are fastened on the stubs.

One of the stubs can penetrate an opening in the housing and can be connected with a drive outside the housing.

The floating bearing can comprise a screw that is inserted into the first bearing arrangement, which meshes into an axial groove of the conveyor shaft.

BRIEF DESCRIPTION OF THE FIGURES

The figures show an embodiment example of the invention, described in more detail below. The figures show the following.

DETAILED DESCRIPTION OF THE PREFERRED EMBODIMENTS

Figure 1:
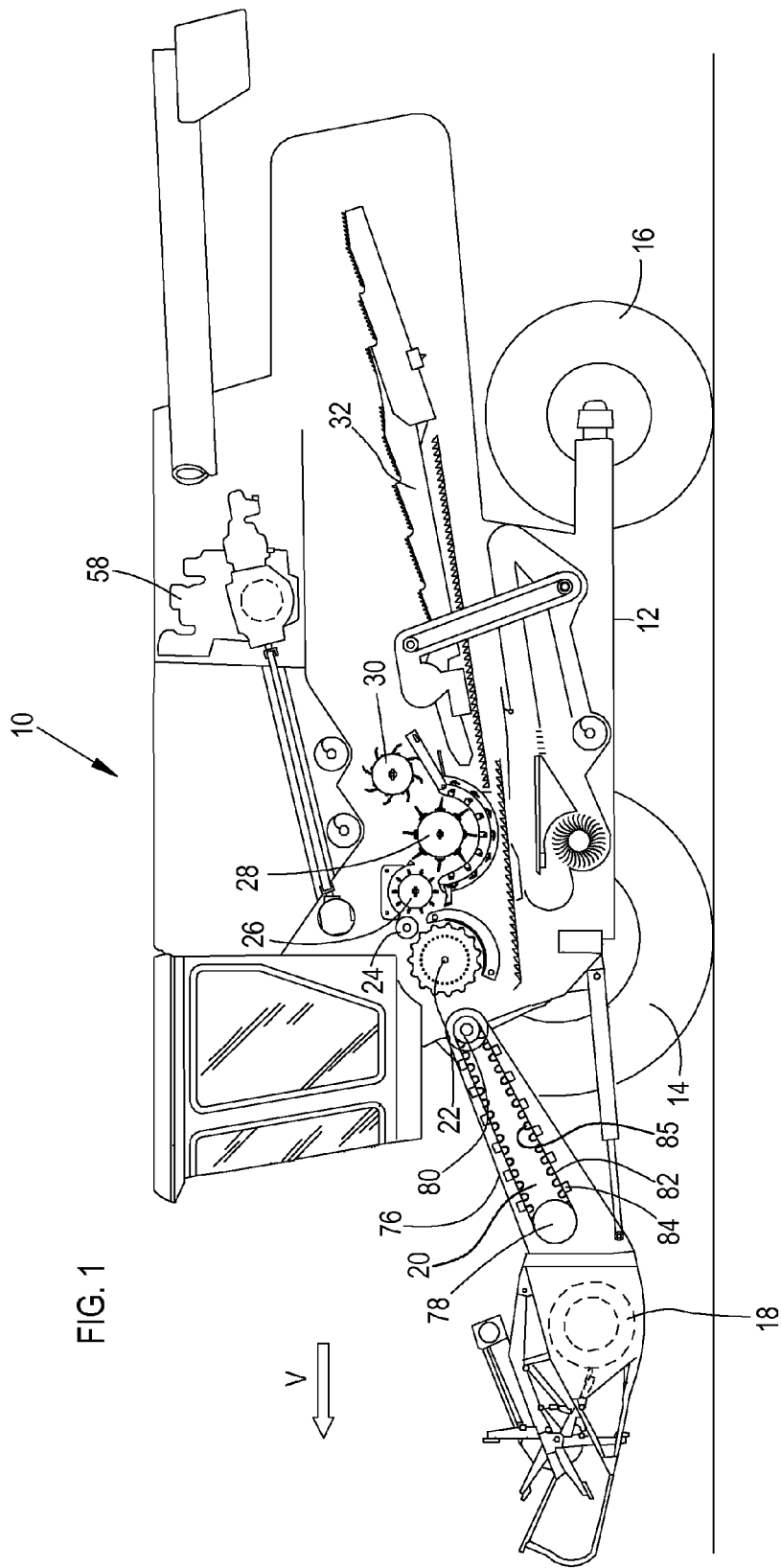
FIG. 1 is a schematic lateral view of a combine harvester with inclined conveyor.

FIG. 1 shows a self-propelled combine harvester 10 with a frame 12, which is supported on the ground via driven front wheels 14 and steerable rear wheels 16 and is moved by them. The wheels 14 are made to rotate by means of driving means, not shown, so as to move the combine harvester 10, for example, over a field that is to be harvested. Direction indications below, both front and rear, refer to the travelling direction V of the combine harvester 10 during the harvesting.

On the front end of the combine harvester 10, a harvesting head 18, in the form of a cutting device, is connected in a detachable manner, in order to harvest crops in the form of grains or other threshable cereals from the field, and supplies them upward and to the rear via a feederhouse 20 to a multidrum threshing assembly, which comprises, arranged behind one another in travelling direction V, a threshing drum 22, a stripping drum 24, and a conveyor drum 26 working from above, a tangential separator 28, and a turning drum 30. Downstream from the turning drum 30, there is a straw walker 32. Any other threshing and separating device can be used instead of the multidrum thresher shown.

The feederhouse 20 comprises a housing 76, on whose lower front end, there is a lower deflection roller 78, and on whose upper rear end, there is a conveyor shaft 80. The lower deflection roller 78 and the conveyor shaft 80 extend transverse to the forward direction and horizontally. Around the deflection roller 78 and the conveyor shaft 80 run endless belts 82, in the form of belts made of flexible material, with conveying elements, shown herein as conveyor teeth 85 that are situated on the inside of the endless belts 82, of which two, three, or several are located laterally at a distance from one another. The conveyor shaft 80 is connected with a combustion engine 58 by means of a drive train, so as to make it rotate during the harvesting. Conveyor cleats 84 extend between two adjacent belts 82. The conveyor cleats 84 are attached to the belts 82 in a detachable manner. During harvesting, the feederhouse 20 works from below, that is, the crops are pulled upward below the belts 82 on the floor of the housing 76 of the feederhouse 20.

The belts 82 correspond to the known cam belts shown and described in DE 10 2009 036 104 A1, whose disclosure is included in its entirety by reference for all that it teaches. Conveyor teeth 85, which are used to transfer the torque of the driven inclined conveyor shaft 80, are fixed on the inside surface of the belts 82. The driven inclined conveyor shaft 80 is equipped with circular cylindrical carrier elements 34, each of which meshes into a gap between adjacent conveyor teeth 85. In this respect, reference is made to FIG. 2, in which the upper inclined conveyor shaft 80 is shown in a perspective view.

Figure 2:
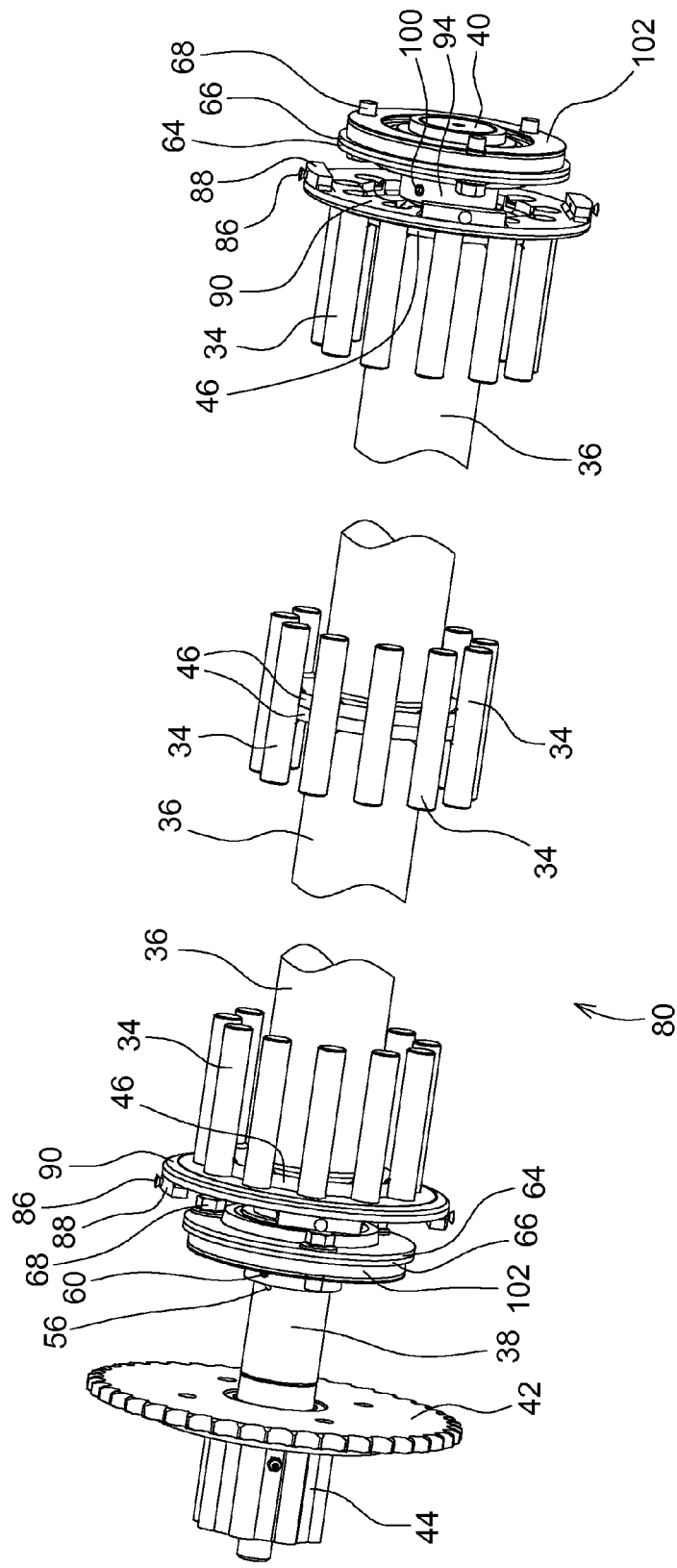
FIG. 2 is a perspective view of a conveyor shaft.

The conveyor shaft 80 is composed of a middle hollow shaft 36 and end stub shafts 38, 40 made of solid material. The end stub shaft 38, shown to the left in FIG. 2, is located, incorporated, in the forward direction V and on the right side of the housing 76 of the feederhouse 20 and is used to transfer the torque from the combustion engine 58 via a chain sprocket 42, which could also be designed as a belt pulley, and an overload coupling 44. The end stub shaft 40, shown to the right in FIG. 2, is used to support the conveyor shaft 80 in the housing 76.

Figure 3:
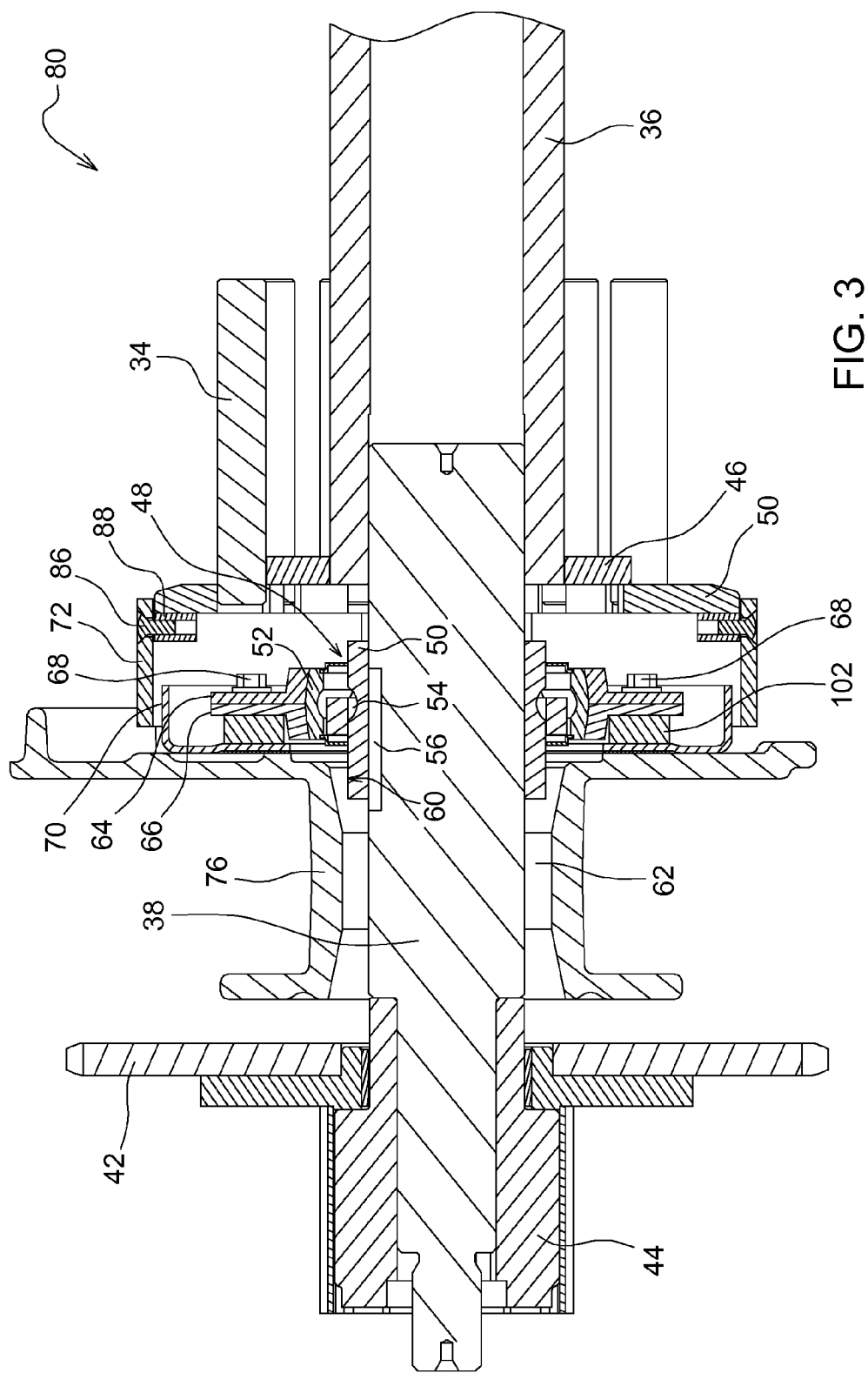
FIG. 3 is a vertical section through the inclined conveyor in the area of the first bearing arrangement, designed as a floating bearing.
Figure 4:
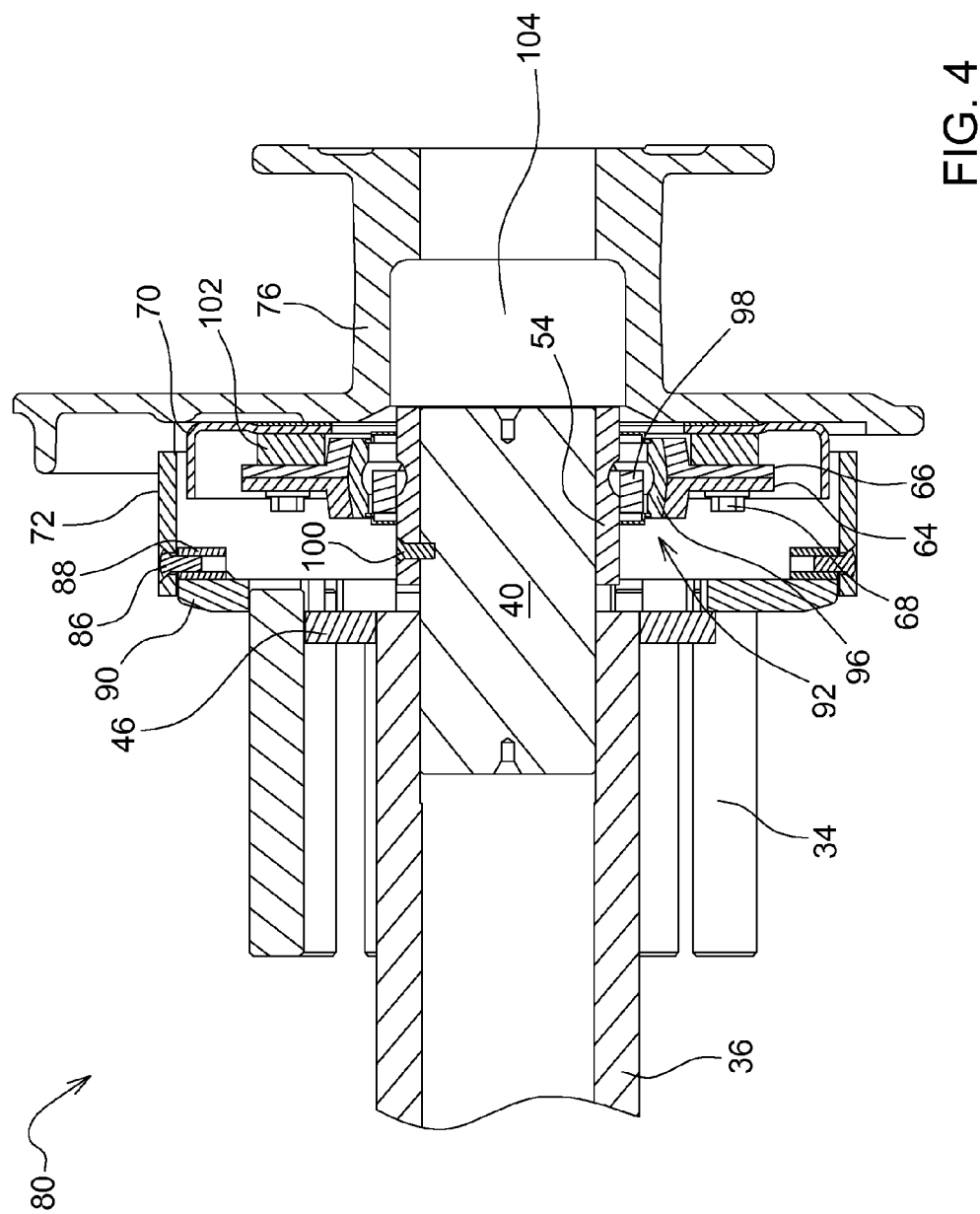
FIG. 4 is a vertical section through the inclined conveyor in the area of the second bearing arrangement.

FIGS. 3 and 4 make it possible to see that the end stub shafts 38 and 40 penetrate the hollow shaft 36 along a length. On the outer ends of the hollow shaft 36, the end stub shafts 38, 40 are welded to the shaft. Also welded and two the hollow shaft 36 and with the carrier elements 34 are ring-shaped holders 46 to affix the carrier elements 34 on the conveyor shaft 80. The ring-shaped holders 46 move around the hollow shaft 36 tangentially. In the middle area of the conveyor shaft 80, two ring-shaped holders 46 are welded to the hollow shaft 36 and the carrier elements 34, directly adjacent to one another, as a result of the torque to be transferred there. With the aid of FIG. 2, one can see that the feederhouse 20 comprises three belts 82 situated next to one another, which work together with one of the three driving wheels located next to one another and made up of carrier elements 34.

The support of the conveyor shaft 80 in this housing 76 is carried out on the right side of the feederhouse 20, in the forward direction, by a first bearing arrangement 48, which is composed of an inner bearing shell 50 and an outer bearing shell 52, which can rotate by means of rolling bearing elements 54 in the form of spheres and is supported on the inner bearing shell 50. The inner bearing shell 50 is fixed by a screw 60, which meshes into an axial groove 56 of the end stub shaft 38, in the circumferential direction, on the end stub shaft 38 (and thus on the conveyor shaft 80), but can be moved, in the axial direction, along the length of the axial groove 56. The first bearing arrangement 48 is, accordingly, a so-called floating bearing. The housing 76 has an opening 62, through which the end stub shaft 38 extends outward. In the area of the opening 62, the housing 76 is equipped with a U-shaped profile. The overload coupling 44 and the chain sprocket 42 are affixed outside the housing 76.

The fastening of the first bearing arrangement 48 on the housing 76 takes place by means of two clamping elements 64, 66, which, with a shape that is complementary to the curved outer surface of the outer bearing shell 52, comprise inner sections, which thus clamp the outer surface of the outer bearing shell 52 between them in the axial direction. The clamping elements 64, 66 are fixed on the housing 76, in turn, by screws 68, which extend through boreholes in a spacing ring 102, situated between the outer clamping element 66 and the housing 76. The clamping elements 66, the screws 68, and the spacing ring 102 are used here as the first holder to fasten the first bearing arrangement 48 on the adjacent area of the housing 76. The screws 68 simultaneously hold a sealing element 70 which is pot-shaped, which sealing element 70 comprises an inner wall, oriented parallel to the side wall of the housing 76 and positioned between the spacing ring 102 and the housing 76, and a ring extending inward on the outer border of the wall. The latter is surrounded with a relatively small gap of an outer cylindrical sealing ring 72, which, in turn, is connected with the ring-shaped holder 46, which is directly adjacent to the first bearing arrangement 48, via screws 86, holding blocks 88, and support rings 90. The sealing element 70 and the outer cylindrical sealing ring 72 prevent crop stalks from wrapping around the conveyor shaft 80 and also avoid the penetration of impurities into the first bearing arrangement 48, located on the inside of the housing 76.

Reference is now made to FIG. 4. The bearing of the conveyor shaft 80 in the housing 76 takes place on the left side of the feederhouse 20, in the forward direction, by a second bearing arrangement 92, which is composed of an inner bearing shell 94 and an outer bearing shell 96, which is supported by rolling bearing elements 98, in the form of spheres, so it can rotate on the inner bearing shell 94. The inner bearing shell 94 is fixed by a screw 100, which meshes into a borehole of the end stub shaft 40, in the circumferential direction and in an axial direction on the end stub shaft 40 (and thus on the conveyor shaft 80), that is, it cannot be moved in an axial direction along the length of the end stub shaft 40. The second bearing arrangement 92 is, accordingly, a so-called fixed bearing. The housing 76 has, adjacent to the end stub shaft 40, an indentation 104 whose diameter is greater than that of the inner bearing shell 94. In the area of the indentation 104, the housing 76 is equipped with a U-shaped profile.

The fastening of the second bearing arrangement 94 on the housing 76 takes place by means of two clamping elements 64, 66, which, with a form that is complementary to the curved outer surface of the outer bearing shell 96, comprise inner sections, which thus clamp the outer surface of the outer bearing shell 96 between them in an axial direction. The clamping elements 64, 66 are, in turn, fixed on the housing 76 by screws 68, which extend through boreholes in a spacing ring 102, located between the outer clamping element 66 and the housing 76. The clamping elements 64, 66, the screws 68, and the spacing ring 102 are used here as the second holder to fasten the second bearing arrangement 92 on the adjacent area of the housing 76. The screws 68 simultaneously hold a sealing element 70 which is pot shaped. Which sealing element 70 comprises an inner wall, oriented parallel to the side wall of the housing 76, positioned between the spacing ring 102 and the housing 76, and a ring extending inward on the outer border of the wall. The latter is surrounded by a relatively small gap of an outer cylindrical sealing ring 72, which, in turn, is connected with the ring-shaped holder 46, which is directly adjacent to the second bearing arrangement 94, via screws 86, holding blocks 88, and support rings 90. The sealing element 70 and the outer cylindrical sealing ring 72 prevent the crop stalks from wrapping around the conveyor shaft 80 and also avoid the penetration of impurities into the second bearing arrangement 92, located on the inside of the housing 76.

The first bearing arrangement 48, designed as a floating bearing, makes it possible to introduce the right end of the conveyor shaft 80 (depicted on the left in FIG. 3) in the forward direction into the opening 62 of the housing 76, further to the left during the installation than is shown in FIG. 3, until the screw 60 is next to the end of the axial groove 56, depicted to the right in FIG. 3. Then, the other end of the conveyor shaft 80, shown in FIG. 4, can be positioned in the vicinity of the indentation 104. Finally, the first and second holders are fixed by placing the screws 86 on the housing 76. Accordingly, the first bearing arrangement 48 makes possible the simple incorporation of a conveyor shaft 80, implemented as a one-part welding assembly, whose stability is needed for the driving of the flexible belts 82.

The embodiments illustrated and described herein are examples of different ways to make and use the invention. The invention, however, is defined by the claims.

The invention claimed is:

1. A combine harvester for harvesting crop in an agricultural field comprising the following:
    ground engaging wheels;
    a frame supported on the ground engaging wheels;
    a threshing assembly supported on the frame for threshing the crop;
    a feederhouse disposed in front of the threshing assembly for receiving cut crop material from a harvesting head and transmitting the cut crop material to the threshing assembly, wherein the feederhouse further comprises,
    a housing;
    a drivable conveyor shaft, located in the housing, on which carrier elements are affixed for the transfer of torque to an endless belt, which belt goes around the drivable conveyor shaft, and upon which conveyor cleats are fastened;
    a deflection roller, located in the housing, around which the endless belt runs;
    a first bearing arrangement, which is fastened on a first end of the drivable conveyor shaft and which is connected, via a first holder, with the adjacent area of the housing; and
    a second bearing arrangement, which is fastened on a second end of the drivable conveyor shaft and which is connected, via a second holder, with the adjacent area of the housing;
    characterized in that the first bearing arrangement is configured as an axially movable floating bearing.

2. The combine harvester according to claim 1, wherein the second bearing arrangement is configured as a fixed bearing.

3. The combine harvester according to claim 1, wherein the holders comprise two clamping elements, which clamp the first bearing arrangement between them.

4. The combine harvester according to claim 1, wherein the first bearing arrangement and the second bearing arrangement are located on the inside of the housing.

5. The combine harvester according to claim 1, wherein the holders also carry a pot-shaped sealing element encircling the first bearing arrangement and axially projecting inward from the housing and while being axially overlapped by a cylindrical sealing ring, which is affixed on a holder of the carrier elements.

6. The combine harvester according to claim 1, wherein the carrier elements are cylindrical rods, which work together with conveyor teeth which are located, on the inside of the belts, which carrier elements are made of, in fact, flexible material and which are welded on holders, which, in turn, are welded on the drivable conveyor shaft.

7. The combine harvester according to claim 1, wherein the drivable conveyor shaft is composed of a middle hollow shaft having ends, and end stub shafts made of solid material, wherein the end stub shafts are inserted on the ends of the middle hollow shaft and are welded thereon, and the first bearing arrangement and the second bearing arrangement are fastened on the end stub shafts.

8. The combine harvester according to claim 1, wherein one of the end stub shafts penetrates an opening in the housing and is connected with a drive outside the housing.

9. The combine harvester according to claim 1, wherein the axially movable floating bearing comprises a screw, wherein the screw can be inserted into the first bearing arrangement and which meshes into an axial groove of the drivable conveyor shaft.

10. The combine harvester according to claim 1, wherein the axially movable floating bearing comprises:
    an axial groove in the drivable conveyor shaft;
    an inner bearing shell about the drivable conveyor shaft;
    a screw extending through the inner bearing shell and meshed into the axial groove in the circumferential direction but movable in the axial direction, along a length of the axial groove; and an outer bearing shell about the inner bearing shell and rotatable relative to the inner bearing shell by rolling bearing elements supported on the inner bearing shell.

11. The combine harvester according to claim 1 further comprising:
   a first U-shaped member having an interior receiving the axially movable floating bearing and facing in a first direction axially along the drivable conveyor shaft; and
   a second U-shaped member carried by the drivable conveyor shaft and having an interior receiving axially movable floating bearing and axially extending portions of the first U-shaped member, the second U-shaped member facing in a second direction, opposite the first direction, axially along the drivable conveyor shaft to cooperate with the first U-shaped member to enclose the axially movable floating bearing.

* * * * *